United States Patent
Sallam et al.

[11] Patent Number: 6,157,533
[45] Date of Patent: Dec. 5, 2000

[54] MODULAR WEARABLE COMPUTER

[75] Inventors: Hussein Sallam, Columbia, Md.; Michael D. Jenkins, Burke, Va.

[73] Assignee: Xybernaut Corporation, Fairfax, Va.

[21] Appl. No.: 09/294,668

[22] Filed: Apr. 19, 1999

[51] Int. Cl.[7] ........................ G06F 1/16
[52] U.S. Cl. ............... 361/683; 361/724; 361/727
[58] Field of Search .................... 361/683, 724, 361/725, 726, 727

[56] References Cited

U.S. PATENT DOCUMENTS 5,572,401 11/1996 Carroll ..................... 361/683
6,069,788 5/2000 Masui ..................... 361/683

*Primary Examiner*—Leo P. Picard
*Assistant Examiner*—Hung Van Duong
*Attorney, Agent, or Firm*—James J. Ralabate

[57] ABSTRACT

This invention involves the use of a number of component-containing modules each assembled together to form a conventional computer except that the computer is body worn and has heat-controlling aspects. One of the heat-controlling aspects is at least one or preferably each side of the module has a heat-air vent as a component of its side. Another heat-controlling item is the selection of heat or non-heat conducting materials to construct the module sides. It is preferable that module sides adjacent a user's body be of a heat-insulating material.

26 Claims, 1 Drawing Sheet

MODULAR WEARABLE COMPUTER

This invention relates to a wearable computer and, more specifically, to a computer made up of an assembly of a plurality of modules housing computer components.

BACKGROUND OF THE INVENTION

It is known that various types of mobile computers may be worn and operated in a hands-free manner. A feature of these prior art computers is that they permit the user to have freedom to use his or her hands for repairing or carrying out other functions while using a fully functional, wearable computer. Perhaps the most commercially successful of these computers is the Mobile Assistant® available from Xybernaut Corporation of Fairfax, Va. Mobile Assistant® is a registered trademark of Xybernaut Corporation.

U.S. Pat. No. 5,305,244 (Newman, et al.) assigned to Xybernaut Corporation describes the details of the Mobile Assistant® and discloses the components and function of such wearable or user-supported computers. Also, copending patent applications Ser. Nos. 08/705,247, 09/092,261 and 09/160,849 describe and claim further improvements and modifications to the Mobile Assistant®. Both U.S. Pat. Nos. 5,305,244 and 5,844,824 are owned by the assignee of the present application, and both patents describe hands free activation means for wearable computers. Also describing wearable computers are U.S. Pat. Nos. 5,285,398 (Janik I) and 5,491,651 (Janik II). Both of these patents disclose a belt computer containing the elements or components of a computer. In Janik I the plurality of computing elements are located on the belt and a flexible signal relaying means connects all of the elements for computing. A protective covering is used for enclosing said computer elements. In Janik II a similar belt computer is described and claimed in which the signal relaying means, the length of which between any two computing elements, is greater than the length of the wearable member between any two computing elements. In both Janik I and Janik II the flexible wearable computer is in the form of a belt comprising around its periphery sequentially positioned computer elements.

In all of the wearable computers of the prior art, two unique problems are found to exist; one is the weight of the computer structure and the second is the heat generated. Both of these problems are not serious problems in desktop or laptop computers because they are neither supported by or in contact with the body of the user. Also, in general purpose computers the configuration is fixed and assembled of predefined components. Some of these components may not be needed for some desired applications. Thus, it would be very desirable to have a body-worn, hands-free computer that can be constructed or assembled with only needed components and not weighed down by unneeded components of a fixed configuration.

SUMMARY OF THE INVENTION

It is therefore an object of this invention to provide a computer structure devoid of the above-noted disadvantages.

A further object of this invention is to provide a novel modular heat sink structure and compositions for use in a body-worn computer to disperse heat from the interior of the computer.

Another object of this invention is to provide a light weight modular computer structure having a housing containing vented computer compartments that can house substantially all of only selectively necessary components needed for a wearable computer when in use.

Still a further object of this invention is to provide a modular computer structure having connector means for connection of peripherals thereto, or a separate peripheral module.

Yet a further object of this invention is to provide a light weight heat reducing modular computer structure that is easy to assemble and convenient to wear.

Still a further object of this invention is to provide a mobile wearable modular computer that optionally has modular peripheral means such as infrared communication means.

Another object of this invention is to provide a light weight modular computer structure that substantially reduces the amount of heat retained by the structure or amount of heat in contact with the body of the user.

Another object is to provide a computer assemblage made up of any desired combination of modules having varied theme properties and configurations.

A further object of this invention is to provide a computer structure that when worn can be used interchangeably on the right or left side of a user.

A still further object of this invention is to provide a mobile computer structure that can be worn on any portion of the body in a hands-free manner.

Another still further object of this invention is to provide a mobile computer having outlets or other modular means to connect onto or to be compatible with components of a stand alone, laptop or desktop computer.

Yet another object of this invention is to provide a modular wearable computer structure that contains modular interconnected housings substantially all of the components needed in a general purpose or conventional computer, including but not limited to, input/output means, processor means and storage means.

Other objects will become apparent upon a further reading of this disclosure.

The above objects and others are accomplished, generally speaking, by providing a mobile, modular body-worn computer comprising a plurality of modular computer housings with means for attaching said computer housings to a user, said modular computer housings comprising substantially all of the components of a conventional computer, said modular housings comprising:

A. a processor or CPU and circuitry module;

B. a peripheral module such as a PCMCIA housing module including a mechanical interface for peripherals;

C. a module for housing a removable storage means;

D. an activation module;

E. an optional module for housing a control mouse; and

F. a module for containing I/O, Input-output electronics;

G. Communication components modules; and

H. Power module separate or within each module.

A mobile body-worn computer of this invention comprises a computer housing made up of an assembly of a plurality of interconnecting modules, hands-free activation means and means for attaching the computer housing to a user. The modular computer housing comprises substantially all of the components of a conventional computer with modular housings having vented front, back, top, bottom and side sections. The back section preferably has means for attachment of cables and the front, back, top and side modular sections can be constructed substantially of a heat conducting and dissipating material whereas the module(s)

of the bottom section is constructed substantially of a heat insulating material. When this computer is worn the bottom section is located adjacent a user's body. As earlier moled, the problems faced with mobile, body-worn computers are completely different than those of desktop, stationary or laptop computers. Most importantly, substantial heat is generated by the CPU and other computer components and, while this is not a significant problem in stationary or laptop computers, it becomes a major problem in body-worn computers since the computer is worn next to the user's body. Some attempts have been made to remedy this problem by using insulating vests or belts or to highly insulate the components and or the computer housing but these efforts most often result in a larger and heavier computer. Since size and weight are also significant factors in body-worn computers, these prior art efforts have not solved the problem and, for that matter, created additional problems of size and weight.

The modular construction of the present computer structure is usable as a safe, mobile body-worn computer. By "conventional computer" is meant throughout this disclosure as any computer known with components both necessary and optional known and used today such as those available from IBM, Dell, Apple, Compaq, Toshiba, Micron, Hewlett-Packard, etc. The modular computer structure of this invention in one embodiment has a plural modular computer housing that can be assembled in any combination and when assembled can be worn around the waist of a user and can be slightly curved on its bottom or inner side (the side that contacts the user's waist) to be contoured in accordance with the curvature of the user's body. It has structural dimensions or area that occupies only a relatively small portion of said user's waistline. Thus, unlike Janik I and II above discussed, it does not encircle the entire waist of the user. When used as a waist or torso-worn computer, it is important it be heat insulated and that cables and other electrical connections extend from the back portion of the computer so as to be out of the way and not interfere with the user's hands when he or she is attempting to repair an object or machine or otherwise use their hands. The computer structure is preferably symmetrical; therefore, the computer can be turned upside down as a unit for left-hand operation. The cable outlets in this manner always will face the back of the user. Conversely, the optional mouse control module will always be a module positioned in the front of the assembled computer housing convenient for the right or left-hand user. The housing of the computer of this invention has a module with outlets for connection to other components such as power supplies, monitors, keyboards, or any other required component. All embodiments of a mobile computer described in co-pending application Ser. No. 09/092,261 and in U.S. Pat. Nos. 5,305,244 and 5,844,824 are included in those structures usable in the present invention with the modification described and claimed herein. The disclosures of these U.S. Pat. Nos. 5,305,244 and 5,844,824 and Ser. No. 09/092,261 are incorporated by reference into the present disclosure. In U.S. Pat. No. 5,844,824, it is disclosed that a further feature of an embodiment of the present invention utilizes an adapter used in each mobile computer to permit the use therein of cellular or hardwire telephone communication. In place of the cellular telephone communication means, a radiofrequency, infrared, laser or fiberoptic transceiver or other communication means may be used. These will generally be referred to in this disclosure as "communication means".

The assembled computer housing in the present invention made up of a plurality of modules includes all of the components found in a conventional computer including a storage means, processor means, audio transducer and converter means and recognizing means, all of which are described in detail in U.S. Pat. Nos. 5,305,244 and 5,844,824. Also included in this embodiment are means for mounting the computer housing onto a user. By "plurality" is meant three or more modules. By "activation means" is meant those activation means disclosed in U.S. Pat. No. 5,844,824. As long as the activation means is hands-free it can be used in the present invention. However, as noted in several of the cited prior art wearable patents, a keyboard may be used if desired in non-preferred embodiments. Generally, attachment is made on a belt worn by a user such as around the waist, over the shoulder or onto a vest torso. In a preferred embodiment, each modular computer housing extending around the entire peripheral portion or walls of the module is a heat sink (heat venting units) comprising ribbed or louvered sections to permit heat to be dissipated from the interior of the housing and to allow a proper internal temperature best suited for computer operation. Also, it is imperative that this body-worn computer be maintained at temperatures safe and suitable to be worn for extended periods of time. The modular computer housing used as the bottom section adjacent the user's body generally is made of a lightweight yet rigid plastic or other suitable non-heat conducting material. In the present invention, a substantial or major portion of the modules used for the top and side sections of the housing are constructed of a heat dissipating material which transmits or conducts the heat from the internal portion of the housing away from the user and via the heat vents to the atmosphere. These vented top and side outer sections (away from the body of the user), together with the above-noted peripheral heat sinks located in all modules efficiently dissipate heat from the internal portion of the housing and make it safe for the user. The modular portion of the computer housing that contacts the user's body preferably can have rubber feet or other insulating material that doubles as a belt loop anchor to attach the modular computer to the user. Thus, the front (away from user's body) and back (adjacent the user's body) undersides of the housing will also have loops attached to the rubber legs through which a belt will fit when attaching to a user. The modules with conduits or connection means which are preferably located in the rear side of the housing are used for cable connection to power means, peripherals, and the body or head-mounted display or conventional monitor. The display used in the present invention can be any type monitor such as head-mounted display, flat panel monitor, wrist or hand-mounted monitor or any other suitable display or monitor.

In addition to the heat dissipation features above discussed, the above noted projecting rubber legs (or other non-conducting materials) are positioned in the bottom portion of the housing so that these heat insulating legs rather than the housing contact the user. These legs put an insulating air space between the user and the housing to further reduce the heat problem. These legs also double in function as the loop holders that allow the user to place his other belt through the loops provided. This feature and the above features will be further described in relation to the drawings.

DETAILED DESCRIPTION OF THE DRAWINGS AND PREFERRED EMBODIMENTS

Figure 1:
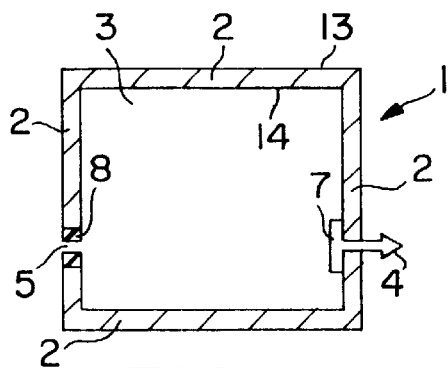
FIG. 1 is a front plan view of a computer component module of the present invention.
Figure 3:
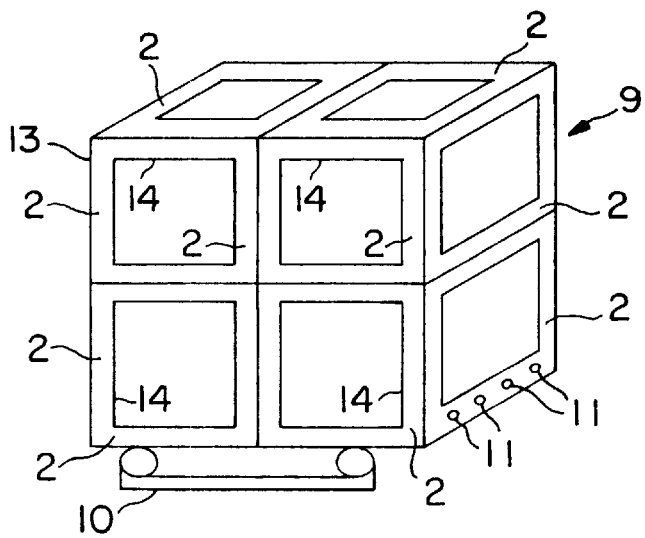
FIG. 3 is a perspective view of an assembled wearable computer of an embodiment of this invention with four modules connected to each other.

In FIG. 1 a module 1 of the computer of this invention is illustrated; in this instance the module houses the CPU, but any component(s) of a computer may be housed in a similar module. The module 1 has walls, sides or peripheral portions with heat vents 2 therein so that a maximum amount of heat generated by the CPU (or other computer component) is vented or dissipated into the atmosphere from the internal portion 3 of the module 1. Each wall acts as a heat transfer or heat sink to vent heat out of the module 1 and provide individual venting of heat from each module 1. While it is preferred that each module 1 be connected to another module (as in FIG. 3) it is within the spirit of this invention to have each vented module in a vest pocket (or the like) in electrical connection to each other. However, the configuration of a single assembled housing as shown in FIG. 3 is highly preferred. In FIG. 1 the vented walls surround the entire module so that maximum heat venting is provided; however, it is within this invention for at least one wall of each module perhaps the outer wall to be heat vented. Each module has a male connecting means 4 and a female connecting means 5 to allow attachment of module to module. These attachment means 4 and 5 can also act as the electrical connection between the computer components in each module 1. Therefore, the connectors 4 and 5 can preferably be electrically conductive. Any suitable connecting means and electrical circuitry can be used with the present invention. It is only essential to the present invention that the wearable computer be made up of interconnected vented modules. In addition to the heat dissipation vents 2 provided in each module, the material composition of each module can also vary to control heat conduction; for example, the top and side portions of each module can be constructed of a heat conducting material such as magnesium, aluminum, metal or other heat conducting material. This heat conducting material conducts heat from the interior of each module and away from the user's body. The bottom portion(s) of each module or the portion closest to the user's body is constructed of a substantially non-heat conducting material such as some plastics such as ABS resin, FRP resin, rubber, wood, silk, Styrofoam, fiberglass or any other suitable heat insulating material. It is critical to the present invention that at least one side wall or peripheral portion of each module 1 have a heat venting means or heat sink 2. In a preferred embodiment of the present invention, all six sides of each module have a heat vent 2 in addition to a selected material (heat conductor or non-heat conductor) construction. The "bottom" of each module refers to that portion closest to the user's body, the "top" section of each module is that portion opposite to the "bottom". The "sides" are the walls connecting the "bottom" and "top" portions. Each module 1 can be of any configuration; the drawings illustrate a square or rectangular shape; however, any suitable shape may be used. Since each component of a computer generates some heat, each module 1 should be of similar construction; however, if desired, the CPU module can have the maximum (all six sides) heat ventilation. In different modules, for example, the specifically constructed peripherals module or others can have less than all sides vented or different materials or surface areas, or different means or any combination of these. Therefore, while FIG. 3 shows all modules 1 of the same configuration, any mixture can be used such as one side vent (as FIG. 4) and two side vents (as FIG. 5) can be mixed with the modules of FIG. 1. Any mixtures of varied vented modules can be used. Also the sizes of each module can vary—they all don't have to be the same size as shown in FIG. 3. This modular arrangement allows for easier repair service or replacement of worn or upgraded components; for example, if the storage means module is worn, only it needs to be replaced rather than the entire computer structure as is the case with each separate module.

Figure 2:
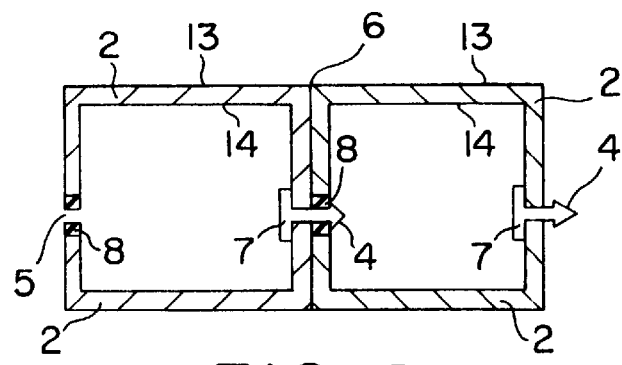
FIG. 2 is a front plan view of two computer component modules of this invention as they are connected or assembled.

In FIG. 2, two compartment modules 1 are shown attached via module connectors 4 and 5 which also act as the electrical connections between components housed within each module 1. The surrounding portion of each slot 5 is preferably an electrically conductive material as is the connector 4. Each module 1 fits complimentary to the next adjacent module in a tight configuration 6 to reduce or maintain size of the assembled computer structure of FIG. 3. The backing 7 of connector 4 and the surrounding section 8 of connector 5 are also electrically conductive. As noted earlier, the material compositions and sizes of the modules 1 can vary depending upon the desired results. Also connectors 4 and 5 are located on all sides of the module for connection to those other modules above, below and to the side. All of these connectors 4 and 5 are not shown in the drawings but can be put wherever required for proper mechanical and electrical connections between modules. The interior wall 14 of side 13 is a heat conductor which conducts heat generated from within the inside of each module to heat sink 2.

FIG. 3 shows the completed assembly of modules 1 containing various components of a computer. A user can mix and match what modules 1 are necessary for his or her wearable computer. Sometimes a PCMCIA card module is not necessary, so to reduce the size, weight and heat of the wearable computer the PCMCIA module can be omitted from the assembled computer 9 as can any other component-module not necessary to the specific user needs. For clarity in FIG. 3, the walls 2 are not shaded to indicate a heat venting wall but, as noted earlier, preferably all sides have heat ventilation (as in FIG. 1), but only a partial, or one or only outside walls can have heat sinks 2 if desired. Each wearable computer 9 has a belt loop with rubber legs or means 10 for attachment to a user as disclosed in U.S. Pat. No. 5,305,244; 5,719,743; 5,719,744 and 5,844,824, all patent disclosure of which are incorporated by reference into the present disclosure. Also, connectors 4 and 5 are omitted from FIG. 3 for clarity purposes. In this figure, four modules are illustrated, i.e. a CPU module, an Input-Output module, an activation module (such as audio activation or keyboard) and a peripherals module. As suggested earlier, any number of components and modules 1 can be used to fit the needs. The preferred embodiment shown in FIG. 3 provides maximum heat ventilation via heat sinks 2 from the inside via walls 14 and heat sinks 2 of the modules to the atmosphere. The peripherals module has openings 11 for connecting computer 9 to peripheral such as floppy drives, bar code scanners, cameras, CD Roms, VGA port or (xtemal monitor connectors, or PCMCIA cards. The shape of modules 1 and assembled computer 9 may be of any shape, size, material or configuration. It is contemplated that square modules 1 can be mixed with triangular modules, round, oval or modules of different thermal constructions or any other mixture. The material construction of the modules also plays an important part in the present invention. Lightweight materials with the proper heat or non-heat conductivity should be selected.

Figure 4:
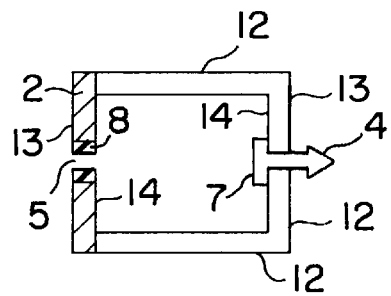
FIG. 4 is a front plan view of a module of this invention with at least one side portion having a heat vent.

In FIG. 4 a module with only one side 2 as a heat sink is shown. This module may be used to house those components that generate less heat although heat vents 2 on all sides still provides the best solution to the heat generated in wearable computers. Sides 12 without the heat vent 2 can be hollow to allow the air in between the wall sections 13 and 14 to act as a heat insulator.

Figure 5:
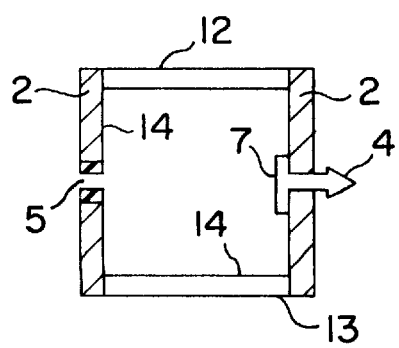
FIG. 5 is a front plan view of a two sided vented module.
Figure 6:
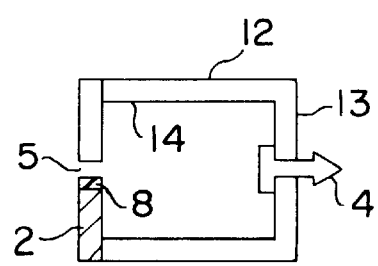
FIG. 6 is a front plan view of a module having only a portion of one side vented.

FIG. 5 shows a module with two sides having a heat sink or heat venting means 2 and the remaining four sides without air or heat venting means 2. The above definition of FIG. 4 applies equally as well to the module of FIGS. 5 and 6 with non-venting sides 12 and insulating air between side sections 13 and 14. Any number of sides or a portion of a side may be heat vented by the present invention such as a side portion vented as in FIG. 6 where only one-half a side is vented.

The preferred and optimumly preferred embodiments of the present invention have been described herein and shown in the accompanying drawings to illustrate the underlying principles of the invention but it is to be understood that numerous modifications and ramifications may be made without departing from the spirit and scope of this invention.

What is claimed is:

1. A hands-free, wearable computer comprising means for attachment to a user and a plurality of assembled heat-air vented modules, each module having wall or side portions and each module housing at least one component of a conventional computer including components selected from the group consisting of a storage means, a processor, an input-output device, an activation means, peripheral connection means, and mixtures thereof, said activation means comprising means selected from the group consisting of audio activation means, pen activation means, eye-tracking activation means, electroencephalography activation means, head and arm-tracking means and mixtures thereof.

2. The wearable computer of claim 1 wherein said heat-air vented modules comprise modules having a heat sink as a wall or a portion of a wall on at least one of said wall or side portions.

3. The wearable computer of claim 1 wherein said heat-air vented modules comprise modules having a heat sink as a wall on all of said wall or side portions.

4. The wearable computer of claim 1 wherein each of said modules has both electrical and mechanical connection means, said connection means used to connect one module to at least one other module.

5. The wearable computer of claim 1 wherein each of said modules has at least one of said connection means on each wall or side of said module to provide means for connecting each side to an adjacent module.

6. The wearable computer of claim 1 comprising user attachment means for attachment to the user's torso or waist.

7. The wearable computer of claim 1 wherein any portion of said computer adjacent to a user's body when worn is constructed of heat-insulating material and any portion of said computer away from a user's body is constructed of a heat-conducting material.

8. The wearable computer of claim 1 wherein said activation means comprises voice activation means.

9. The wearable computer of claim 1 wherein said modules assembled to form said computer are all of the same size.

10. The wearable computer of claim 1 wherein said modules assembled to form said computer include at least one of a different size.

11. The wearable computer of claim 1 wherein said modules assembled to form said computer are all of the same shape or configuration.

12. The wearable computer of claim 1 wherein at least one of said modules is of a different shape or configuration than at least one of the others.

13. A mobile hands-free wearable computer made up of an assembly of a plurality of heat-air vented modules, each module having sides or peripheral sections which define a substantially closed compartment into which a computer component will fit and function, each of said modules housing at least one component of a conventional computer, said component selected from the group consisting of a storage means, a processor means, an input-output device, an activation means, peripheral connection means and mixtures thereof, said activation means comprising means selected from the group consisting of audio activation means, pen activation means, eye-tracking activation means, electroencephalography activation means, head and arm-tracking activation means and mixtures thereof.

14. The wearable computer of claim 13 wherein said heat-air vented modules comprise modules having a heat sink as a wall or a portion of a wall on at least one of said peripheral or side portions.

15. A mobile, hands-free computer made up of an assembly of a plurality of heat-air vented modules, each module having sides or peripheral sections which define a substantially closed compartment into which a computer component will fit and function, each of said modules housing at least one component of a conventional computer, said component selected from the group consisting of a storage means, a processor means, an input-output device, an activation means, peripheral connection means, and mixtures thereof, in addition to communication means, said activation means, comprising means selected from the group consisting of audio activation means, pen activation means, manual activation means, eye-tracking activation means, electroencephalography activation means, mouse or touch activation means, head and arm-tracking activation means and mixtures thereof.

16. The mobile computer of claim 15 wherein said heat-air vented modules comprise modules having a heat sink as a wall on all of said peripheral or side portions.

17. The mobile computer of claim 15 wherein each of said modules has both electrical and mechanical connection means, said connection means used to connect one module to at least one more module.

18. The mobile computer of claim 15 wherein each of said modules has at least one of said connection means on each side or peripheral portion of said module to provide means for connecting each side to an adjacent module.

19. The mobile computer of claim 15 comprising means for attachment to the user's torso or waist.

20. The mobile computer of claim 15 wherein any portion of said computer adjacent to a user's body when worn is constructed of heat-insulating material and any portion of said computer away from a user's body is constructed of a heat-conducting material.

21. The mobile computer of claim 15 wherein said activation means comprises voice activation means.

22. The mobile computer of claim 15 wherein said modules assembled to form said computer are all of the same size.

23. The mobile computer of claim 15 wherein said modules assembled to form said computer include at least one of a different size.

24. The mobile computer of claim 15 wherein said modules assembled to form said computer are all of the same shape or configuration.

25. The mobile computer of claim 15 wherein at least one of said modules is of a different shape or configuration than at least one of the others.

26. The mobile computer of claim 15 wherein the communication means is a hardwire telephone, or a wireless telephone.

* * * * *